United States Patent [19]

Haimer

[11] Patent Number: 5,682,683
[45] Date of Patent: Nov. 4, 1997

[54] PROCESS AND DEVICE FOR PRESSING BIOMASS

[75] Inventor: Franz Haimer, Weiherstrasse 21, 86568 Hollenbach, Germany

[73] Assignee: Franz Haimer, Hollenbach, Germany

[21] Appl. No.: 583,071
[22] PCT Filed: Jul. 29, 1994
[86] PCT No.: PCT/EP94/02501
§ 371 Date: Jan. 11, 1996
§ 102(e) Date: Jan. 11, 1996
[87] PCT Pub. No.: WO95/04909
PCT Pub. Date: Feb. 16, 1995

[30] Foreign Application Priority Data

Aug. 10, 1993 [DE] Germany ............. 43 26 849.8

[51] Int. Cl.$^6$ .................................................. F26B 7/00
[52] U.S. Cl. .................... 34/425; 34/210; 34/236; 56/12.8; 56/13.3
[58] Field of Search ................ 34/423, 425, 426, 34/429, 432, 451, 472, 482, 512, 580, 586, 61, 68, 80, 93, 636, 651, 204, 210, 236, 76; 56/12.8, 13.3; 237/12.3 A

[56] References Cited

U.S. PATENT DOCUMENTS

| 3,572,663 | 3/1971 | Van Der Lely | 56/12.8 |
| 3,998,036 | 12/1976 | Jarrell | 56/12.8 |
| 4,912,914 | 4/1990 | Wingard | 34/113 X |
| 5,443,208 | 8/1995 | Potter | 237/12.3 A |

OTHER PUBLICATIONS

Webster's II New Riverside Dictionary® 1994 pp. 148 & 868 1994.

Primary Examiner—John M. Sollecito
Assistant Examiner—Steve Gravini
Attorney, Agent, or Firm—McGlew and Tuttle

[57] ABSTRACT

The present invention pertains to the problem of chopping, drying and compressing into pellets—which shall be used especially as a fuel—freshly harvested biomass, especially cereal plants, in one operation. The chopped stalk material is moved forward for this purpose according to the present invention over a broad surface in a thin layer (32) in the manner of an accordion, while a warm air flow passes through it, before the stalk material is fed into the intake wedge of a pelletizing device (15). Screw conveyor groups (11, 12, 13) arranged at different levels are preferably used as the conveying means, and their direction of conveyance (23) is at right angles to the direction of travel (24) of the harvester (1), whereas the gaseous heating medium flows through the layers (32) being conveyed vertically (29) from bottom to top.

19 Claims, 9 Drawing Sheets 5,682,683

1

PROCESS AND DEVICE FOR PRESSING BIOMASS

FIELD OF THE INVENTION

The present invention pertains to a process for picking up, drying, and pressing biomass (stalk material), as well as to a device for carrying out this process.

BACKGROUND OF THE INVENTION

A traveling drying unit for drying harvested material, in which the stalk material picked up is fed, without being chopped, into a drying device by means of a lift conveyor, has become known from DE-A-1 632 887. This drying device comprises a plurality of flinger rolls, which extend at right angles to the direction of travel, and under which a trough-shaped wall each is located. In addition, air heated by flames is blown by means of a blower into the drying device. The stalk material is flung up by the flinger rolls and is said to be transferred as a result to the respective adjacent flinger roll. The flinger rolls are arranged at three levels one on top of another. From the last flinger rob of the lowermost level the dried harvested material then enters a plunger-type press, where the harvested material is compressed into a strand of finite length extending in the transverse direction. The strand is then cut into slices by means of circular knives, and these slices are said to crumble spontaneously on falling into a lift conveyor channel. Compressed feed in the form of wafers is apparently to be produced in this manner.

Such a harvester consumes a considerable mount of energy due to the air being heated by flames and due to the drive of the ringer rolls. The prior-art unit causes environmental nuisance due to the fuel consumption and the noise generated by the high speeds of rotation of the ringer rolls. The wafers produced are not suitable for use as a fuel.

SUMMARY AND OBJECTS OF THE INVENTION

In contrast, the basic object of the present invention is to carry out the pick-up, drying, and compression of the harvested material in a different manner, which is characterized by saving energy, low noise, and being environmentally acceptable, wherein the compressed harvested material shall be used not only as a feed, but also as a fuel.

According to the invention, a process and device provided for picking up, drying and pressing biomass, particularly harvested biomass material. The process includes using a harvester to pick up and convey harvested material upwardly. The material is transferred to a dryer wherein the dryer is provided with a plurality of conveying rolls arranged one on top of another at different levels. Each level of the dryer has a plurality of conveying rolls disposed next to each other. The harvested material is transferred in a broad layer on to the conveying rolls located in an upper level. The harvested material is moved while exposing the harvested material to gashes heating medium. The harvested material is moved along an axis of the conveying rolls in an upper level and is deflected onto a next lower level conveying roll level at an end of the conveying roll in the upper level. The gaseous heating medium is guided at a right angle with respect to the conveying rolls, through the different levels. The harvested material is fed from the conveying rolls to a pressing device. The harvested material is pressed with the pressing device including chopping and pelletizing the harvested material with the pressing device.

The harvester is provided with a pick up device and a lift conveyor for the harvested material. A drying device is provided with the conveying rolls including the different conveying roll levels with each level having a plurality of conveying rolls arranged next to each other. A transfer device is provided for transferring the harvested material to the next lower conveying roll. Flow means is provided for generating a flow of gaseous heating medium. Additionally, a chopper feed means for the gaseous heating medium and a pressing device are provided.

Unlike in the aforementioned state of the art, the harvested material is fed in the chopped state into the drying device, in which the harvested material is moved along the conveying rolls in a broad, but relatively thin layer in a meandering pattern through the levels of conveying rolls. The heated drying air flows through this layer of stalk material at right angles, preferably from bottom to top. The exhaust gases of the drive engine of the harvester and the heated air surrounding the said engine are used as the source of energy. The harvested material, dried in an energy-saving manner, is finally fed to a pelletizing press, which is the subject of another invention according to DE-P-42 14 111.7, which was not previously published. The pressed material is suitable for use as a fuel due to this pelletization.

The heating medium may be provided by using exhaust gasses of the internal combustion engine wherein these exhaust gases are fed to a gas/air heat exchanger. The cooled exhaust gas may be used to heat the pelletizing device.

The biomass may be transferred from one conveying roll level to the next by offsetting the conveying roll levels and/or providing an appropriate discharging element at the conveying roll. The conveying rolls preferably extend at right angles to the direction of travel of the harvester.

If the biomass is heated to about 80° C., an optimal energy balance is obtained, because the heat which is generated during the travel of the harvester in any case is sufficient to heat the biomass to this temperature. On the other hand, the hot biomass can thus be pelletized particularly well. It appears to be useful for the direction of conveyance of the biomass layer formed during drying to be at fight angles to the direction of travel of the harvester and for the direction of flow of the heating medium to be approximately vertical. This offers the advantage that the entire width of the harvester is utilized for drying the biomass, and a sufficient height of the harvester can also be utilized due to the layer being guided in a meandering pattern.

Any conveying means which is porous or permeable to air and guarantee the entrainment of the chopped stalk material is suitable for use as a conveying means for the layer formed.

Especially good experience has been gained with the present invention when the layer formed is moved forward by a plurality of screw conveyors arranged next to each other and one on top of another at different levels. The chopped stalk material is fed along the individual screw shafts to their free front side, after which it drops onto the subjacent other level of additional screw conveyors, whose direction of conveyance is, of course, opposite the direction of conveyance of the preceding level.

The present invention is schematically represented as an example in the drawings. In the drawings, FIGS. 1 and 2 are a side view and a top view respectively of a first exemplary embodiment of a harvester, FIG. 3 is a cross sectional view taken along line III—III in FIG. 1 through a drying device arranged at different levels for the chopped biomass;

DESCRIPTION OF THE PREFERRED EMBODIMENT

Figure 1:
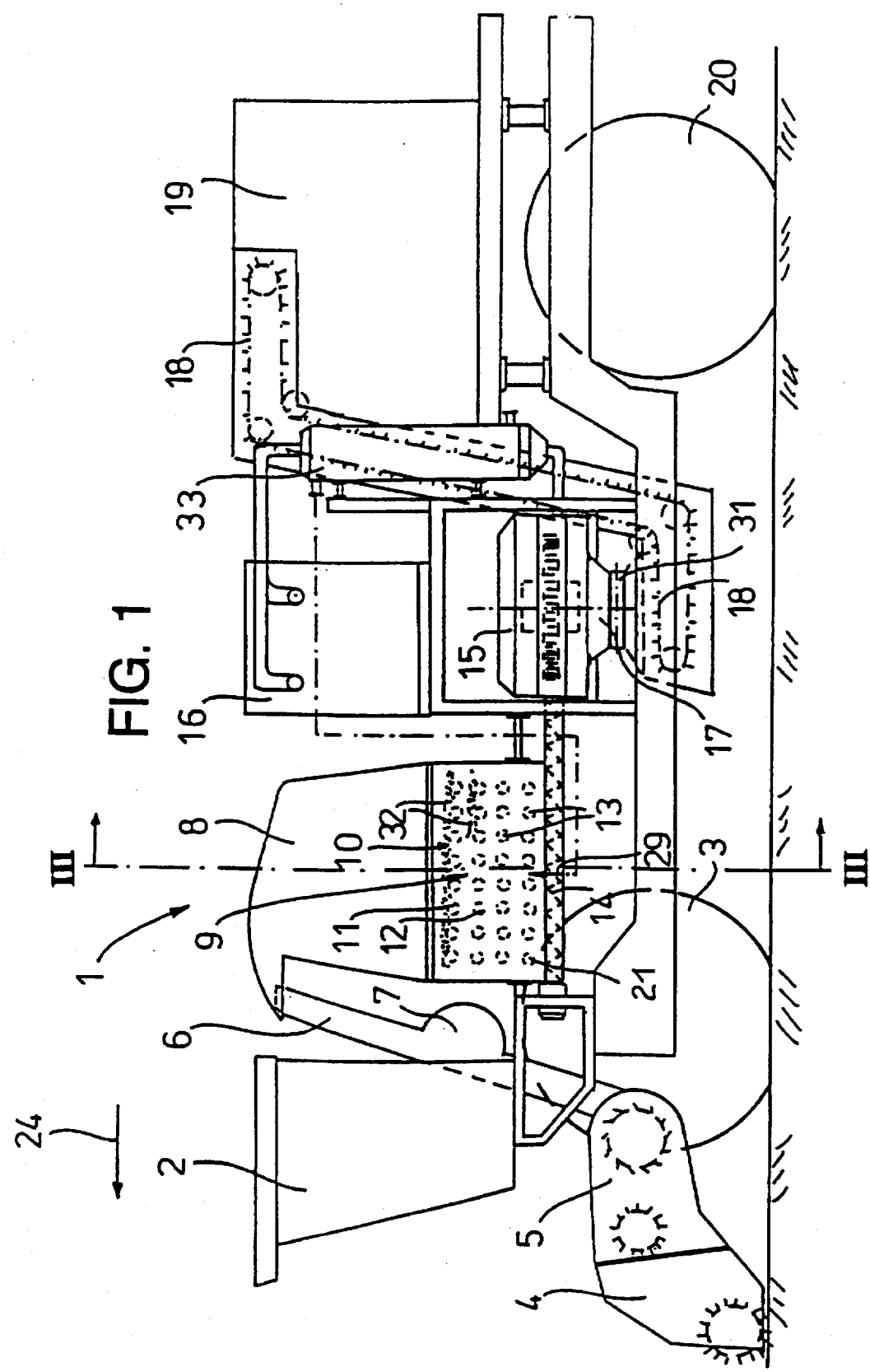
Figure 2:
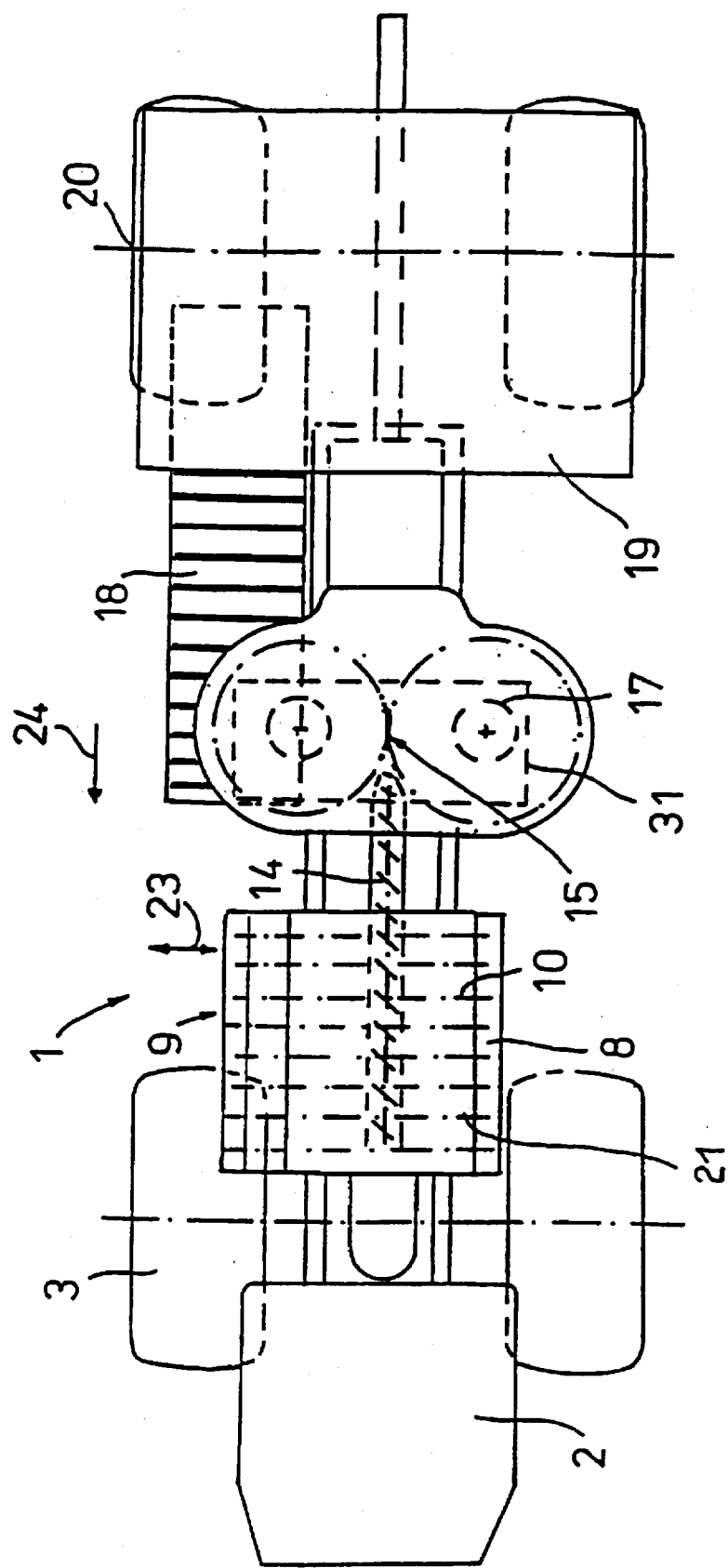

The design of the harvester 1 schematically shown in a first embodiment variant in FIGS. 1 and 2 differs quite substantially from that of a prior-art harvester, e.g., a harvester thresher. The harvester 1 according to the present invention shah be able to pick up biomass from the field, to chop it and to compress it into pellets, wherein the effect of weather shall be eliminated by intensely drying the chopped stalk material before it reaches the pelletizing device. Not only the extraction of moisture, but also an heating of the biomass preferably to 80° C. before it is pelletized are sought to be achieved. The temperature may, of course, vary within a broad range, depending on the type of the biomass and the instantaneous climatic conditions. The only thing that is certain is that the pelletization takes place optimally when heated biomass is fed in.

The size of the harvester 1 is determined by the front axle 3 and the rear axle 20, as well as the driver's cab 2. A usual pick-up device 4, which must be able to cut and pick up the harvested material, which was already mowed and lies on the field, or harvested material standing on stalk, is located in the front area. Such pick-up devices are known in harvester threshers and similar harvesting vehicles, so that it is not necessary to describe them in detail.

The stalk material picked up, which may be especially cereal plants, but also hay, enters through the pick-up device 4 in the area of a chopper 5, which chops the stalk material and feeds it into a bunker 8 for chopped stalk material by means of the blower 7 or another conveying means through the shaft 6. This bunker 8 is part of an arrangement 9 for heating the biomass.

The principle of the drying of the chopped stalk material according to the present invention comprises distributing the chopped material filled into the bunker 8 in a possibly broad, but thin layer 32 and moving this layer along a conveying section 10 in a meandering pattern.

It can be imagined that a conveyor belt guided in a meandering pattern is used as the conveying means, but this is less advantageous because the present invention assumes that the heated gaseous medium is caused to flow through the layer 32 at fight angles 29 thereto.

To eliminate these difficulties, a conveying section 10 formed by a plurality of screw conveyors 21, whose screw conveyors 21 are arranged one on top of another in a plurality of levels 11, 12, 13 and offset in relation to one another, is shown in the exemplary embodiment shown in FIGS. 1 through 4. As can be seen best in FIG. 3, the chopped biomass located in the bunker 8 reaches a tint level 11 of screw conveyors 21, which closes off the bunker 8 at the bottom, and these screw conveyors 21 pick up the stalk material and move it forward along their axes. It would be possible to arrange in the bunker 8 a distributing screw (not shown) or a device having a similar action to distribute the stalk material as uniformly as possible among the numerous screw conveyors 21.

At the end of the first level 11, the stalk material being moved forward drops through the transfer shaft 25 onto the end area of a second level 12 of screw conveyors 21 located under it. The direction of conveyance of the individual screw conveyors 21 is designated by 23. It is also seen that the stalk material is moved forward from right to left in the first level 11 and from left to right in the second level 12. A transfer shaft 26, which transfers the chopped stalk material received to a third level 13, is again located at the end of the second level 12. A transfer shaft 34, which forwards the stalk material to a discharge screw 35, which is arranged sloping obliquely downward and ends approximately in the central longitudinal plane of the harvesting vehicle 1, is located at the end of the third level 13. A feed screw 14 conveys the material picked up into the intake wedge of a pelletizing device 15 (cf. FIG. 1). The pelletizing device 15 may be designed as described in the older DE Patent Application No. P 42 14 111.7.

Figure 3:
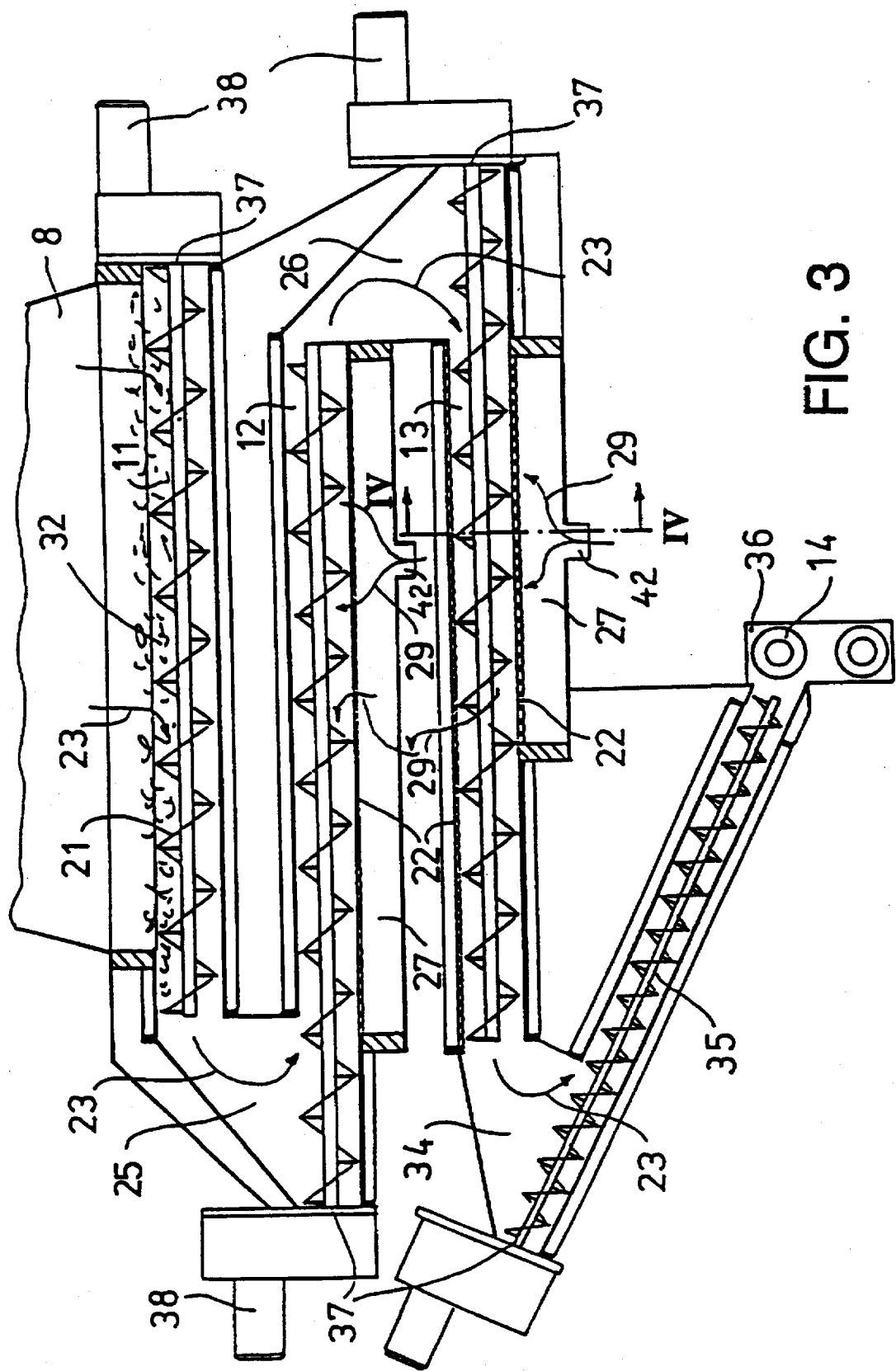

The stalk material being moved by the screw conveyor 21 is heated such that a heated gas, especially air, is fed through the screw conveyor 21 and through the layers 32 of stalk material located thereon, in the direction of the arrows 29 in FIGS. 1 and 3.

Figure 4:
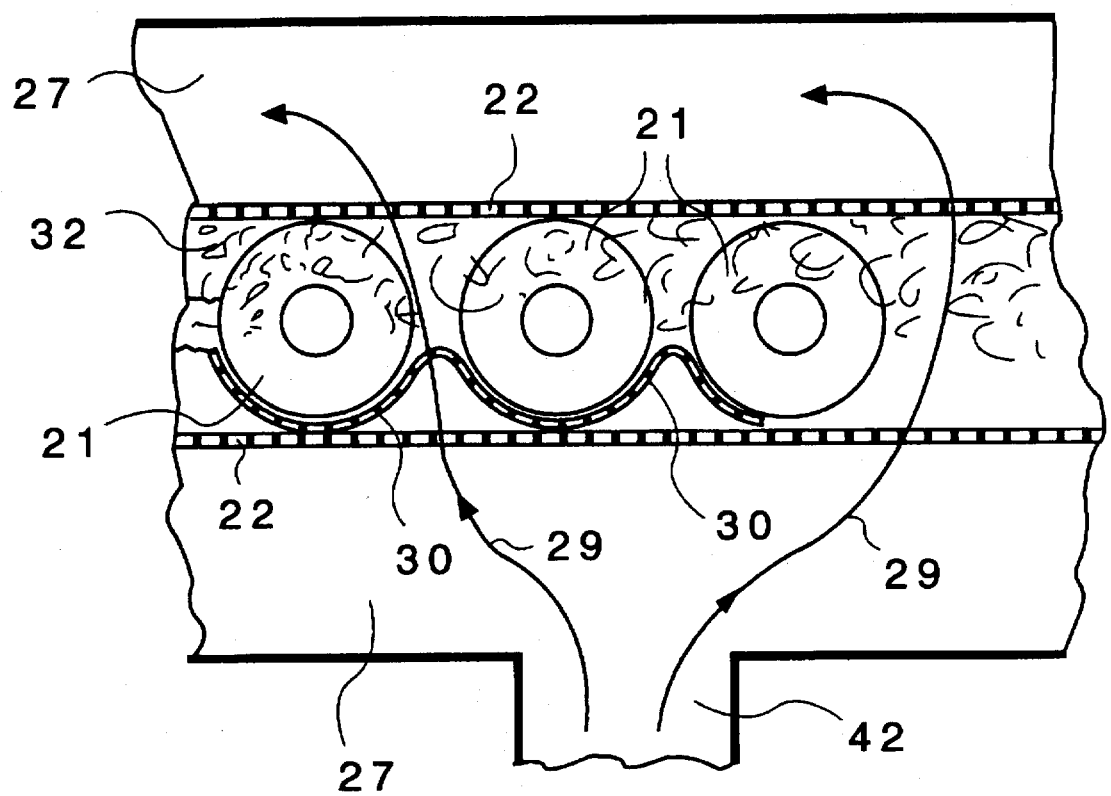
FIG. 4 is a partial cross sectional view through the drying device along line IV—IV in FIG. 3.

As is Shown on a larger scale in FIG. 4, a perforated wall 22, through which the heated gaseous medium can flow from bottom to top and can thus pass through the individual layers 32, is provided for this purpose under the levels 12, 13. The heating medium is obtained from the internal combustion engine 16 of the harvester by guiding the exhaust gases of the internal combustion engine 16 into a gas/air heat exchanger 33. The air heated in this heat exchanger is brought by means of fans (not shown) or the like into the heating spaces 27, which are located under the levels 12, 13 of the screw conveyors 21 and which are covered by the perforated walls 22. The exhaust gases of the internal combustion engine 16, cooled in the heat exchanger, can in turn be guided into the pelletizing device 15 to heat the compressing tools with the residual heat they still contain.

In addition, provisions are made for using the heated recirculated air of the internal combustion engine 16 to heat the pelletizing device 15 and optionally its feed mechanisms.

It can be recognized from the representations in FIGS. 1 and 3 that the space between the driver's cab 2 and the internal combustion engine 16 is utilized by the arrangement 9 for heating the biomass, wherein the entire width of the harvester 1 is available for the length of the screw conveyors 21. Since these screw conveyors 21 are arranged at different levels 11 through 13 one on top of another, a sufficiently large space in height is utilized as well. The direction of conveying 23 of the layer of stalk material 32 consequently extends at right angles to the direction of travel 24 of the harvester, whereas the direction of gas flow 29 is approximately vertical from bottom to top.

As is shown in FIG. 3, the individual screw conveyor 21, 35 in this example is mounted at 37 and driven at 38 on one side only. The screw conveyor 21 must thus be free on its front side on the opposite side to discharge the stalk material being conveyed to the next level of the screw conveyors 21. In order for the screw conveyors 21 to be centered in their position, a stationary wedge 30, which may be arranged, e.g., on the top side of the perforated plate 22, is located in the lower wedge between the screw conveyors 21, as is shown in FIG. 4. These wedges 30 are also designed as perforated wedges in order to allow the hot air to flow through them from the bottom.

Since the chopped stalk material being conveyed is exposed to the effect of heat over a large surface, it is possible to adjust the heating capacity to the pick-up capacity of the pick-up device 4 as well as to the pressing capacity of the pelletizing device 15, and to heat the stalk material to optimal temperature for pelletization.

From the pelletizing device 15 according to FIGS. 1 and 2, the pellets enter a cross conveyor 31 through axial discharge openings 17, and from there a laterally arranged lift conveyor 18, which is provided with suitable carrying elements and which conveys the pellets into a bunker 19, which is arranged above the rear axle 20 in the exemplary embodiment. It is recognized that the units which have the greatest weight, namely, the internal combustion engine 16 and the pelletizing device 15, are favorably arranged between the two axles 3 and 20, so that the weight is uniformly distributed on the axles of the harvester 1, which advantageously have four-wheel drive and both are steerable.

While the screw conveyors 21 and 35 are arranged next to each other and therefore move forward layers 32 of the stalk material, the feed screw 14 must bundle the material taken over and compress it during the feed. This explains why the screw conveyors 21 and 35 can be mounted in an overhung manner at 37.

The situation is different in the case of the feed screw 14. When the mass bundled there is to be moved forward, a unilateral mounting would possibly be overloaded.

Figure 5:
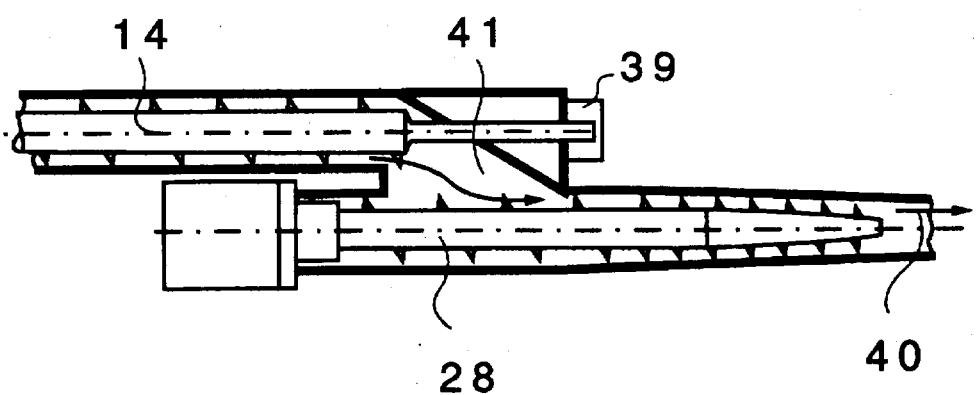
FIG. 5 is a longitudinal sectional view through a feed screw.

It is therefore shown in FIG. 5 that the feed screw 14 is also arranged at different levels, wherein the first part 14 of the feed screw is mounted 39 on both sides, whereas the second part 28 is again mounted on one side only, because it can be shorter, and it opens directly into the inlet 40 of the pelletizing device. A transfer shaft 42 is provided between the two screw parts 14, 28.

It is advantageous to arrange two or more feed screws 14, 28 next to each other in a common channel in order thus to increase the amount of harvested material fed to the pelletizing device.

Figure 6:
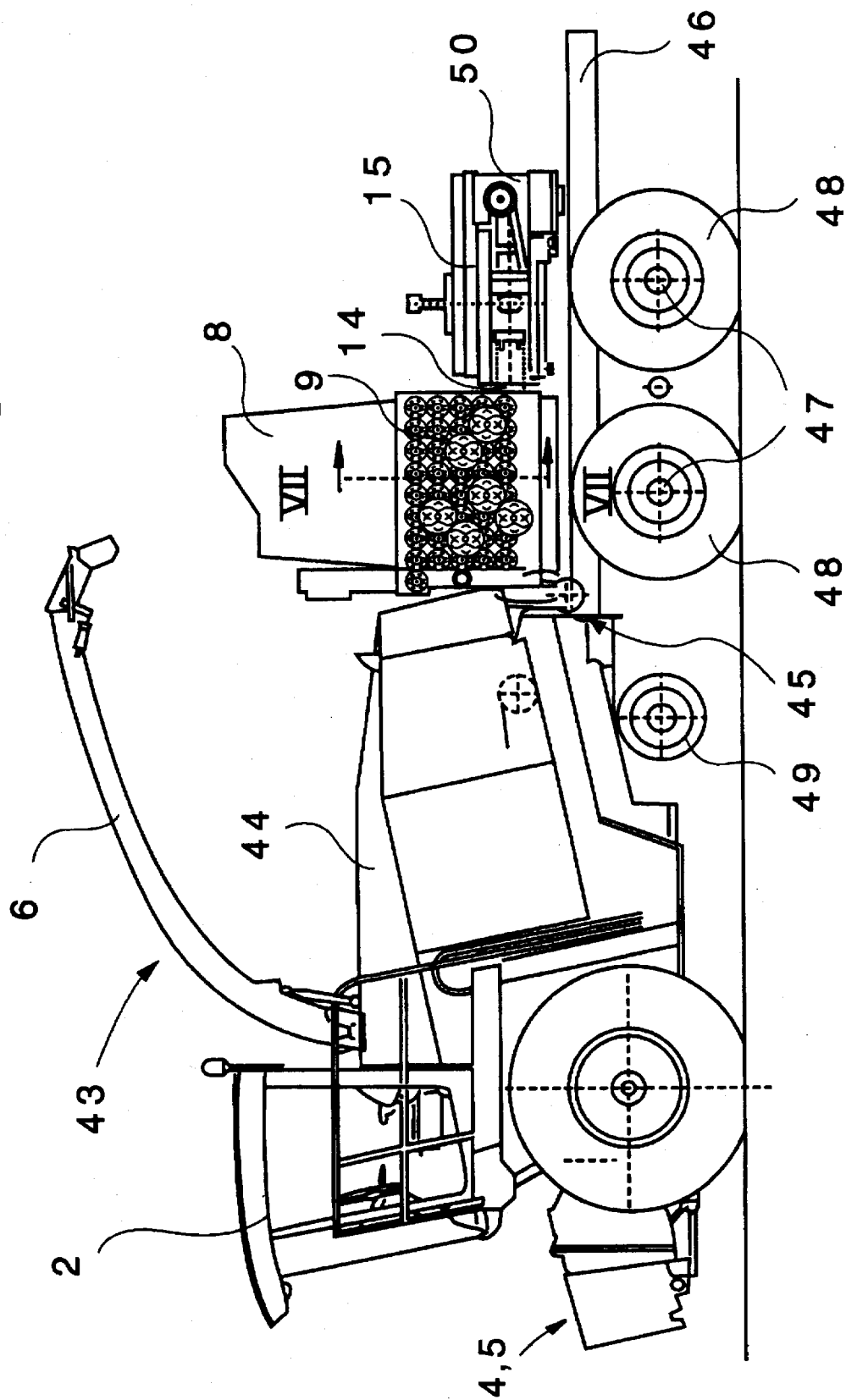
FIG. 6 is a side view of a harvester as an alternative to FIG. 1.

The second exemplary embodiment in FIG. 6 shows a harvester 43 of another design, in which a commercially available, self-propelled chopper 44 is preferably rigidly coupled at 45 With a chassis 46. The chassis 46 may be equipped with a single axle or multiple axles 47 and have preferably steerable wheels 48.

The small chopper wheels 49 are lifted off from the ground when the chassis 46 is coupled With the chopper 44.

The advantage of this measure is the fact that the chassis 46 can pick up the load, of the arrangement 9 for heating the biomass as well as the pelletizing device 15 and its gear mechanism 50 in a better distributed manner. When the chopper 44 is uncoupled from the chassis 46, the chopper 44 can be used alone more intensely and therefore more economically.

Figure 7:
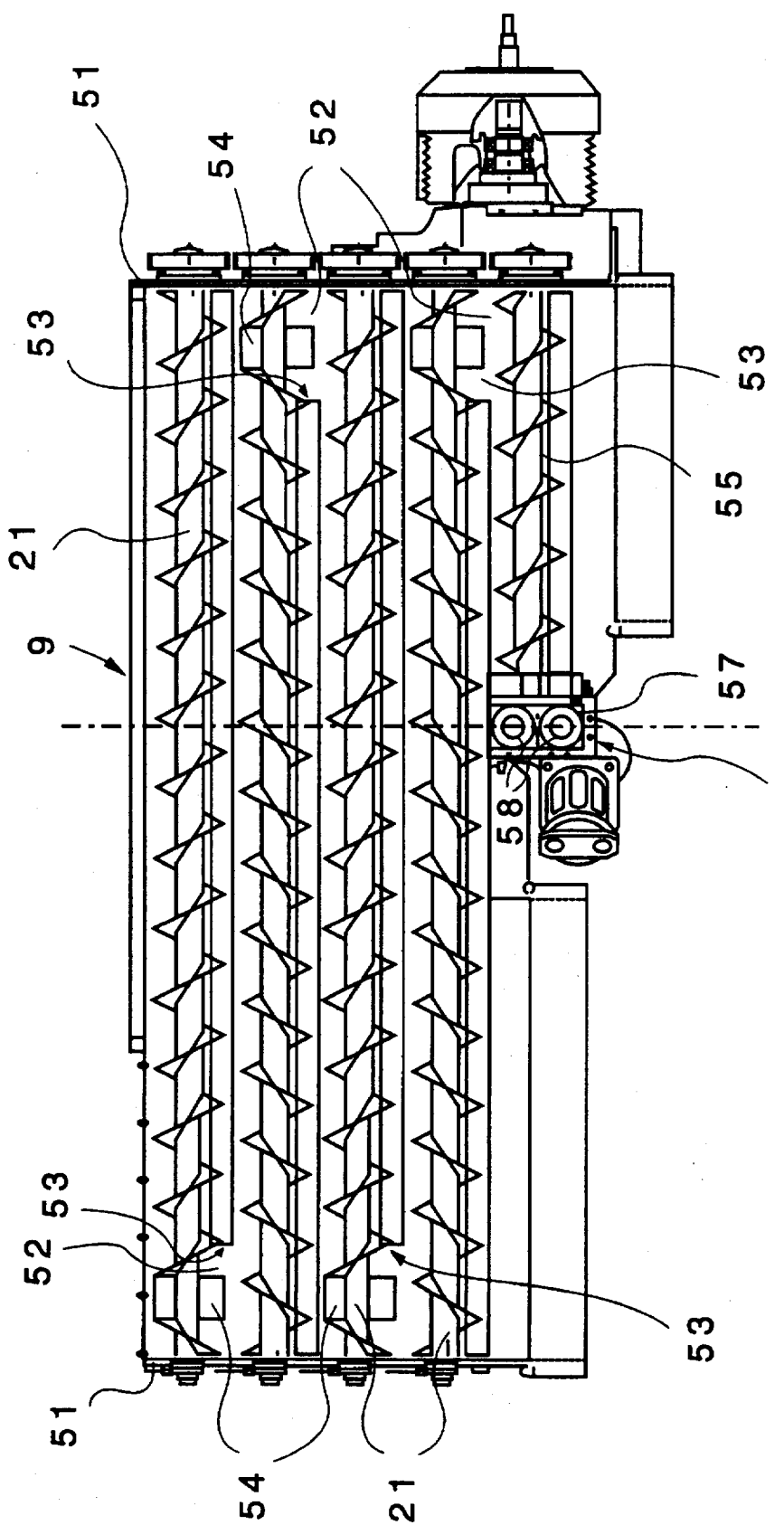
FIG. 7 is a longitudinal sectional view through the drying device along line VII—VII in FIG. 6.

In the arrangement 9 for heating the biomass shown as an alternative in FIG. 7, the conveying rolls 21 are not offset in relation to one another, as is shown in FIG. 3, but they are mounted on both sides in a common machine frame 51. In the transfer area 52, the perforated walls 22 have recesses 53, and the conveying rolls 21 are provided in these areas with suitable discharging elements 54, which convey the biomass from one level 11, 12 into the other level 12, 13 of the conveying rolls 21.

An arrangement 56 for feeding the dried harvested material to the pelletizing device, which has two parallel feed screws 58 in a common housing 57, is provided at the end of the lowermost level 55 of the conveying rolls. As a result, the mount of harvested material fed to the pelletizing device can be increased, and optimal output of the pelletizing device can be achieved.

Figure 8:
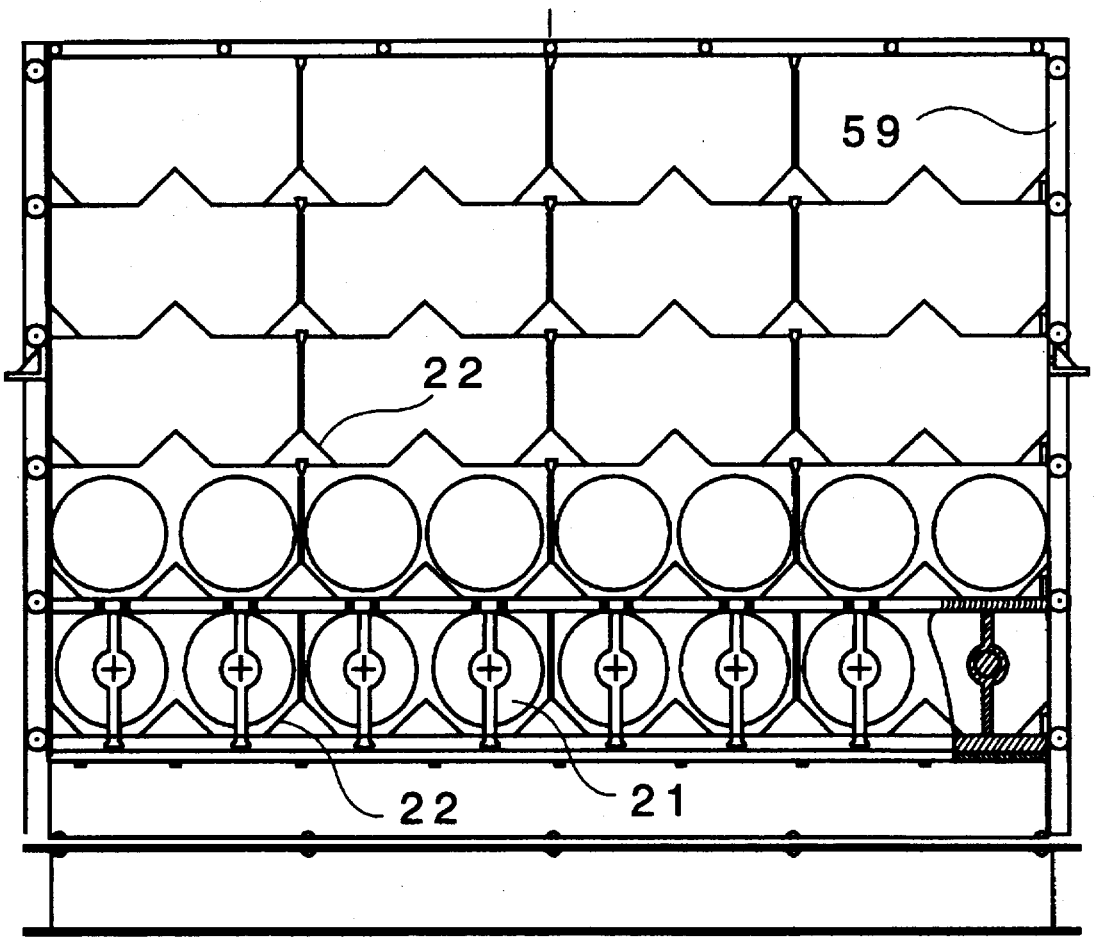
FIG. 8 is a front view of the drying device according to FIG. 7.
Figure 9:
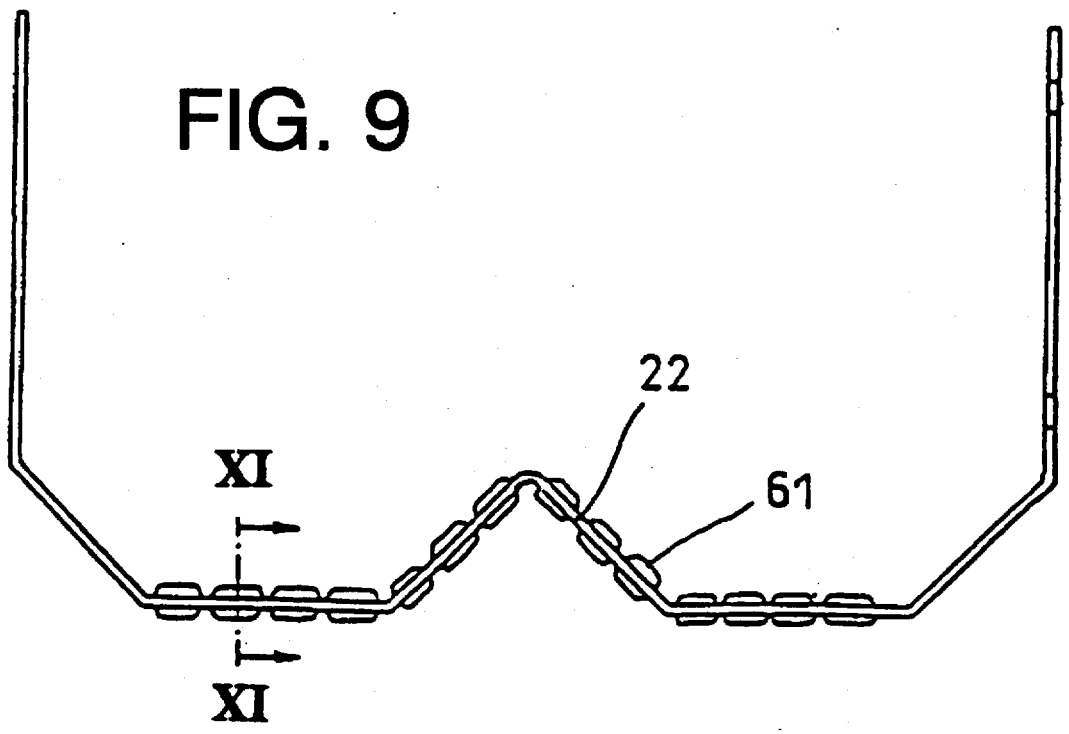
FIG. 9 is a front view of a perforated wall forming a channel.

FIG. 8 shows a longitudinal section through the arrangement 9 for heating the biomass, from which it can be recognized that the conveying rolls 21 are arranged in a frame 59 of perforated walls 22, which are, as is shown in FIG. 9, trapezoidally adapted to the circumference of the individual conveying roll 21.

Figure 10:
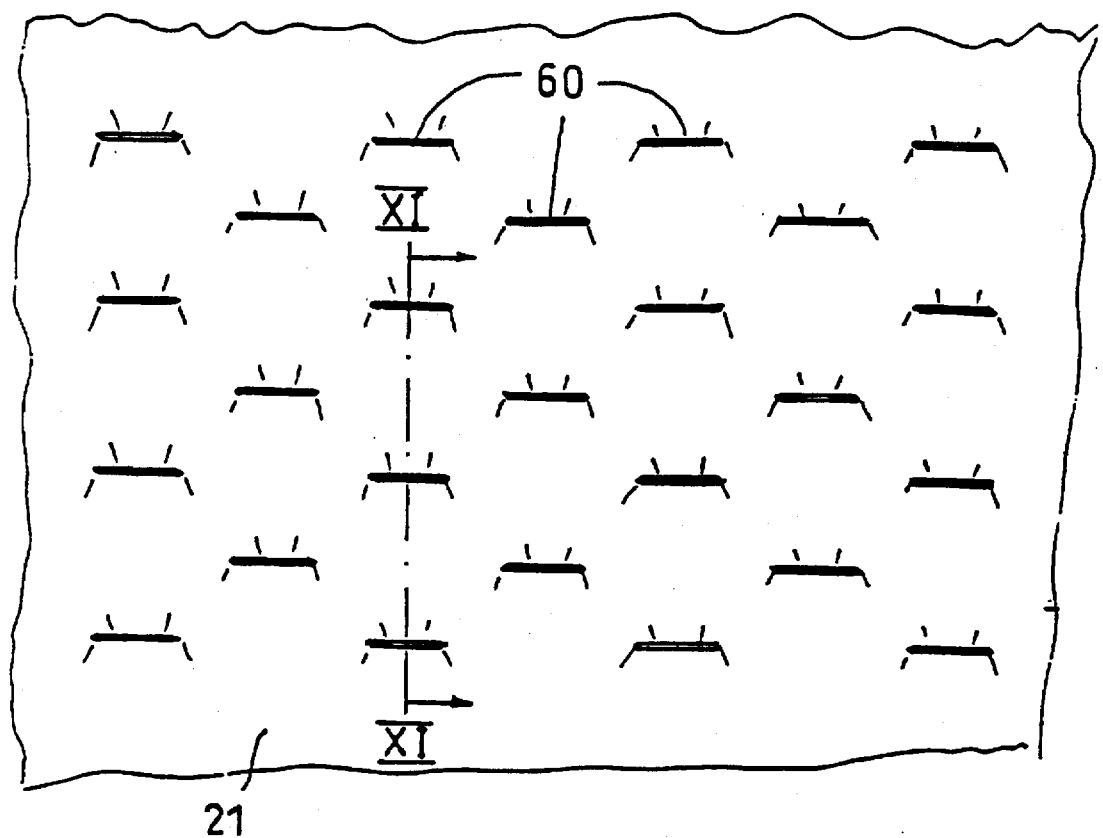
FIG. 10 is a top view of a partial area of the perforated wall.
Figure 11:
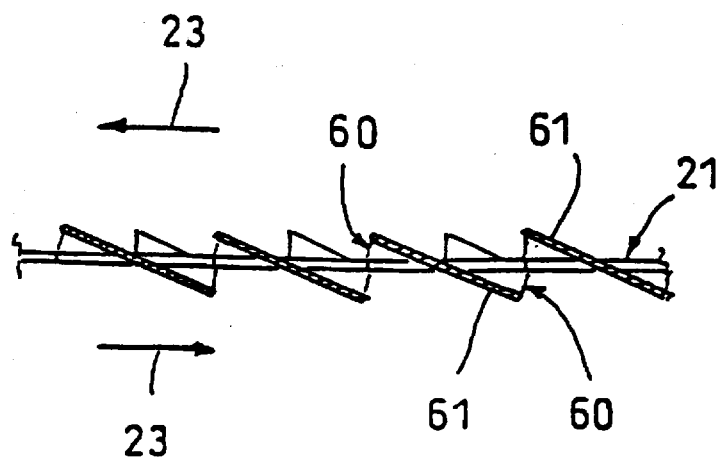
FIG. 11 is a cross sectional view through the perforated wall along line XI—XI in FIG. 9.

The perforated walls 22 have a special design in this exemplary embodiment, as is apparent from FIGS. 10 and 11. Thus, the perforated wall 22 has a plurality of linear slots 60, which are provided in rows and whose rows are offset in relation to one another.

Each slot 60 is associated with a shoulder 61, which is designed—due to the deformation of the perforated wall 22—such that the shoulder 61 is elevated in the direction of conveyance of the biomass on the surface of the perforated wall 22 in front of the slot and has a lowered elevation behind the slot 60 on the lower surface of the perforated wall 22.

A design of the perforated wall 22 which is favorable for flow is thus obtained. The individual shoulder 61 rises in the direction of conveyance or flow 23. Since the directions of conveyance 23 are opposite on the top side and the underside of the perforated wall 22, a structure favorable for flow is obtained method due to the special profiling of the shoulders 61 on the two sides of the perforated wall 22.

This design of the perforated wall 22 is novel and therefore independent. This perforated wall 22 can be advantageously used wherever holes, slots or other similar interruptions are to be arranged in a manner that is favorable for flow.

The special profiling of the shoulders 61 also ensures a directed flow of the warm air passing through the perforated walls 22 in the direction of the conveying movement of the harvested material.

If the individual perforated wall 22 is deformed, e.g., bent into the trapezoidal shape according to FIG. 9, it can be adapted to the circumference of the individual conveying roll 21, and a channel which is favorable for conveyance can thus be created for the movement of the harvested material along the conveying roll 21, as it is also shown in FIG. 8.

I claim:

1. A process for picking up, drying, and pressing biomass, the process comprising the steps of:

using a harvester to pick up and convey upward harvested material;

transferring the harvested material to a drier, the drier being provided with a plurality of conveying rolls arranged one on top of another at different levels, each level having a plurality of conveying rolls disposed next to each other, the harvested material being transferred in a broad layer onto all said conveying rolls located in an upper level;

moving the harvested material while exposing the harvested material to a gaseous heating medium, including moving the harvested material along an axis of said conveying rolls in said upper level and deflecting the harvested material onto a next lower conveying roll level at an end of said conveying roll in said upper level, said gaseous heating medium being guided through said different levels;

feeding said harvested material from said conveying rolls to a pressing device; and pressing the harvested material with a pressing device pelletizing the harvested material with the pressing device.

2. A process in accordance with claim 1, wherein the harvested material is heated to a temperature on the order of magnitude of about 80° C. for the pelletization.

3. A process in accordance with claim 1, wherein the harvester includes an internal combustion engine, exhaust gases of said internal combustion engine of said harvester being sent into a gas/air heat exchanger, from which heated air is used to heat the harvested material being conveyed, and cooled exhaust gases are used to heat said pelletizing device.

4. A process in accordance with claim 1, wherein the harvester includes an internal combustion engine, exhaust gases of said internal combustion engine of said harvester being sent into a gas/air heat exchanger, recirculated air heated by the said internal combustion engine being used to heat said pelletizing device.

5. A process in accordance with claim 1, wherein:
said gaseous heating medium is guided at a right angle to an axis of said conveying rolls.

6. A process in accordance with claim 1, wherein:
said gaseous heating medium is guided substantially perpendicularly to a plane of said conveying rolls.

7. A process in accordance with claim 1, wherein:
said material is chopped after said material is picked up and before said material is transferred into said drier;
said material is transferred to a top of said conveying rolls located in said upper level and then moved to an end of said conveying rolls located in said upper level;
said material is transferred in said next lower conveying roll level in a direction opposite to a direction of moving in said upper level;
said gaseous heating medium is guided substantially vertically through said levels for heating the material;
said pressing forms pellets suitable for one of heating purposes and as a feed.

8. A device for treating biomass, comprising a self-propelled harvester including:
a pick-up means for picking up harvested material;
a lift conveyor connected to said pick-up means and for removing the harvested material from said pick-up means;
a drying device with a plurality of conveying rolls arranged at different conveying roll levels, said conveying rolls including screw conveyors for moving the harvested material along their axes and providing a direction of conveyance changing from one level to the next, each said conveying roll level having a plurality of conveying rolls arranged next to each other;
a feed means for feeding gaseous heating medium;
a pressing device for pressing the harvested material into pellets;
transfer means for conveying the harvested material to the next lower conveying roll level, said transfer arrangement being located at a front-side end of the conveying roll belonging to one said level;
flow means for generating a flow of the gaseous heating medium directed at right angles to the plane of conveyance.

9. A device in accordance with claim 8, wherein said transfer means is formed by one of offsetting said conveying roll levels and by recesses in bottoms which separate the said individual levels of said conveying rolls from one another in conjunction with corresponding discharging elements at the said conveying rolls.

10. A device in accordance with claim 8, wherein said conveying rolls extend at right angles to the direction of travel of the harvester.

11. A device in accordance with claim 8, further comprising a bunker, and chopper means joining said pick-up device and for chopping the harvested material, and said lift conveyor opening into said bunker.

12. A device in accordance with claim 8, wherein a discharge-side end of a lowermost conveying roll level opens into a feed screw, said feed screw extending approximately along the axis of the harvester and connecting to said pressing device.

13. A device in accordance with claim 8, wherein said conveying rolls are arranged between perforated walls, said heating medium flowing through holes in said perforated walls.

14. A device in accordance with claim 13, wherein said perforated walls are adapted to the circumference of said conveying rolls and have a trapezoidal shape.

15. A device in accordance with claim 13, wherein one of said perforated walls has a plurality of slots of slot-like openings extending at right angles to the said direction of conveyance, with shoulders gently dropping opposite said direction of conveyance being arranged in front of said slot-like openings.

16. A device in accordance with claim 15, wherein said shoulders located between two said slots are arranged one behind the other in said direction of conveyance and are elevated above the surface of said perforated wall at a leading one of said slots, and are elevated in the opposite direction from the lower surface of said perforated wall at a rear one of said slots.

17. A device in accordance with claim 15, wherein said slots are arranged in rows extending at right angles to said direction of conveyance at spaced locations from one another, and the rows are offset among them such that an individual slot of one row is located approximately in a middle behind a gap between said slots of an adjacent row.

18. A device in accordance with claim 8, wherein said chopper is a self-propelled chopper and said harvester includes a chassis, which can be coupled rigidly, with steerable wheels, and which carries said drying device and said pressing device with its drive.

19. A device in accordance with claim 8, wherein:
said lift conveyor transfers the material a top of said conveying rolls located in an uppermost of said conveying roll levels;
said screw conveyors move the material to an end of said conveying rolls located in said uppermost level;
said screw conveyors in a next lower level move the material in a direction opposite to a direction of moving in said uppermost level;
said flow means guides said gaseous heating medium substantially vertically through said levels and perpendicular to said levels for heating the material;
said pressing device forms pellets suitable for one of heating purposes and as a feed.

* * * * *